US010392965B2

(12) United States Patent
Cortequisse

(10) Patent No.: US 10,392,965 B2
(45) Date of Patent: Aug. 27, 2019

(54) SPLITTER NOSE OF A LOW-PRESSURE COMPRESSOR OF AN AXIAL TURBOMACHINE WITH ANNULAR DEICING CONDUIT

(71) Applicant: Safran Aero Boosters SA, Herstal (Milmort) (BE)

(72) Inventor: Jean-Francois Cortequisse, Heers (BE)

(73) Assignee: Safran Aero Boosters SA (BE)

( * ) Notice: Subject to any disclaimer, the term of this patent is extended or adjusted under 35 U.S.C. 154(b) by 563 days.

(21) Appl. No.: 15/202,174

(22) Filed: Jul. 5, 2016

(65) Prior Publication Data
US 2017/0016347 A1    Jan. 19, 2017

(30) Foreign Application Priority Data
Jul. 17, 2015 (BE) .................................. 2015/5462

(51) Int. Cl.
*F01D 25/02* (2006.01)
*B64D 15/04* (2006.01)
*F01D 25/10* (2006.01)
*F02C 7/047* (2006.01)
*F04D 29/58* (2006.01)
(Continued)

(52) U.S. Cl.
CPC ............ *F01D 25/02* (2013.01); *B64D 15/04* (2013.01); *B64D 33/02* (2013.01); *F01D 25/10* (2013.01); *F02C 7/047* (2013.01); *F04D 29/522* (2013.01); *F04D 29/542* (2013.01); *F04D 29/545* (2013.01); *F04D 29/584* (2013.01); *B64D 2033/0233* (2013.01);
(Continued)

(58) Field of Classification Search
CPC .......... F01D 25/02; F01D 25/10; F02C 7/047; B64D 2033/0233; B64D 33/02; B64D 15/04; F04D 29/522; F04D 29/542; F04D 29/545; F04D 29/584; F05D 2250/141; F05D 2260/30; F05D 2220/323
See application file for complete search history.

(56) References Cited

U.S. PATENT DOCUMENTS 9,759,088 B2 *  9/2017  Belmonte ............... F02C 7/047
2009/0152401 A1  6/2009  Sternberger
(Continued)

FOREIGN PATENT DOCUMENTS

EP         0918150 A1    5/1999

OTHER PUBLICATIONS

European Search Report from corresponding Belgium Application No. BE 201505462, dated Mar. 24, 2016.

*Primary Examiner* — Ninh H. Nguyen
*Assistant Examiner* — Jesse M Prager
(74) *Attorney, Agent, or Firm* — Sandberg Phoenix & von Gontard P.C.

(57) ABSTRACT

The invention comprises a splitter nose of an axial turbomachine, in particular a compressor, the splitter nose comprising: an annular casing an annular conduit for de-icing a separation edge of the splitter nose; the conduit is connected to the casing only in a first zone in the region of a hot air inlet and in a second zone located in a position diametrically opposite the inlet, or forming relative to the axis of the turbomachine an angle α less than 30° with respect to the position so as to allow expansion deformations of the conduit. The invention also comprises a compressor and a turbomachine comprising such a splitter nose.

19 Claims, 2 Drawing Sheets

(51) Int. Cl.
*B64D 33/02* (2006.01)
*F04D 29/52* (2006.01)
*F04D 29/54* (2006.01)

(52) U.S. Cl.
CPC .. *F05D 2220/323* (2013.01); *F05D 2250/141* (2013.01); *F05D 2260/30* (2013.01)

(56) References Cited

U.S. PATENT DOCUMENTS

| | | |
|---|---|---|
| 2010/0236213 A1 | 9/2010 | Schilling |
| 2013/0084170 A1 | 4/2013 | Hindle et al. |
| 2013/0180227 A1 | 7/2013 | Todorovic et al. |

\* cited by examiner

SPLITTER NOSE OF A LOW-PRESSURE COMPRESSOR OF AN AXIAL TURBOMACHINE WITH ANNULAR DEICING CONDUIT

CROSS-REFERENCE TO RELATED APPLICATIONS

This application claims the benefit, under 35 U.S.C. § 119, of BE 2015/5462 filed Jul. 17, 2015, the disclosure of which is incorporated herein by reference in its entirety.

FIELD

The invention relates to the field of axial turbomachines. More specifically, the invention relates to a splitter nose of a low-pressure compressor of an axial turbomachine comprising an annular de-icing conduit. The invention also relates to a low-pressure compressor.

BACKGROUND

A splitter nose of a low-pressure compressor of an aircraft turbomachine comprises a separation edge that is subjected during flight to an accumulation of ice. That accumulation of ice results from the flight conditions, in particular the temperature at high altitude. Pieces of ice which become detached from the separation edge may damage the turbomachine by being drawn into the compressor, the accumulated ice may further reduce the output of the turbomachine. In order to overcome this phenomenon, it is known to provide the splitter nose with de-icing means by circulation of hot air in the splitter nose.

The published patent document EP 0918150 A1 discloses a splitter nose of a turbomachine which comprises an annular casing which forms an annular cavity and a separation edge. The splitter nose comprises an annular conduit that is located in the cavity. The conduit is connected to a pipe for supplying hot air and comprises holes, through which the hot air can diffuse in the cavity in order to de-ice the separation edge. The conduit comprises an air inlet with a ball and socket connection with respect to the supply pipe. It further comprises rigid fixing means with respect to the casing. The teaching is advantageous in that the ball and socket connection at the inlet of the conduit is flexible which promotes the strength thereof in the event of expansion of the conduit and associated mechanical constraints. However, the rigid connection of the annular conduit with respect to the casing generates risks involving the conduit breaking.

SUMMARY

An object of the invention is to provide a solution which overcomes at least one of the disadvantages of the prior art, in particular the prior art mentioned above. More specifically, an object of the invention is to facilitate the production of a splitter nose for a low-pressure compressor of a turbomachine.

The invention relates to a splitter nose of an axial turbomachine, in particular a compressor, the splitter nose comprising: an annular casing which forms an annular cavity and a circular separation edge of an air flow of the turbomachine; an annular conduit which forms a first zone and that is arranged in the annular cavity, the conduit being configured in order to de-ice the separation edge by means of circulation of hot air in the cavity, the conduit comprising an air inlet that is intended to be connected to a hot air supply pipe of the turbomachine; wherein the conduit is connected to the casing only in a second zone; diametrically opposite the air inlet, and optionally in the region of the air inlet, the second zone forming an angular portion of the annular conduit that is less than 60°, in various instances less than 30°, for example less than 10° so as to allow expansion deformations of the conduit.

According to various advantageous embodiments of the invention, the first zone of the annular conduit forms an angle relative to the axis that is less than 30°, in various instances less than 20°, for example less than 10° with respect to the position of the air inlet.

According to various advantageous embodiments of the invention, the annular conduit is connected to the casing at one or more positions in the first zone and in the second zone, respectively.

According to various advantageous embodiments of the invention, the annular conduit is free from contact with the circular casing with the exception of the first zone and the second zone.

According to various advantageous embodiments of the invention, the circular casing comprises an internal surface which delimits the cavity, that is free from fixing means for the annular conduit over more than 120°, for example more than 160°.

According to various advantageous embodiments of the invention, the annular conduit is connected to the first zone and the second zone by one or more flanges, or one or more plates, extending radially and/or axially.

According to various advantageous embodiments of the invention, the annular conduit is connected by one or more hooks which partially surround the annular conduit, and/or the connections are radial contacts.

According to various advantageous embodiments of the invention, the casing comprises an internal circular wall which extends from the separation edge and that is capable of delimiting a primary flow and an external circular wall that is concentric with the internal wall and which extends from the separation edge and that is capable of delimiting a secondary flow, and at least one partition wall which radially joins the internal and external walls, the conduit being connected to the first zone and the second zone at least over one of the internal and external walls, in various instances over each of the walls and/or the partition wall.

According to various advantageous embodiments of the invention, the internal wall comprises an outer shroud that is intended to receive radial vanes.

According to various advantageous embodiments of the invention, the separation edge is integrally formed on the external circular wall.

According to various advantageous embodiments of the invention, the air inlet comprises a tube which extends transversely to the annular conduit and which comprises a skin or which comprises a first external skin and a second internal skin that is concentric with the skin, the or at least one of the skins, in various instances each of the skins, being connected to the conduit.

According to various advantageous embodiments of the invention, the tube generally extends parallel with the axis of the turbomachine.

According to various advantageous embodiments of the invention, the tube is connected to the casing, in various instances by a flange.

According to various advantageous embodiments of the invention, the annular conduit comprises a series of outlet holes for the circulation of hot air in the annular cavity, the holes being distributed over the circumference of the conduit, in various instances over the whole of the circumference of the conduit. The holes of the annular conduit allow diffusion of the hot air in the annular cavity.

According to various advantageous embodiments of the invention, the outlet holes have a cross-section of flow which increases with the distance from the air inlet of the conduit.

According to various advantageous embodiments of the invention, the annular conduit has a circular or oval cross-section.

The invention also relates to a compressor of an axial turbomachine for an aircraft, comprising: a splitter nose for separating the air flow of the turbomachine into a primary flow and a secondary flow; a hot air supply pipe; wherein the air splitter nose comprises the features and function described herein, the inlet of the annular conduit being in communication with the hot air supply pipe.

According to various advantageous embodiments of the invention, the supply pipe comprises an internal wall and an external wall, the inlet of the annular conduit being connected to the supply pipe in the region of one of the internal and external walls.

According to various advantageous embodiments of the invention, the tube is connected to the supply tube by a flange or by welding.

According to various advantageous embodiments of the invention, in the normal direction of assembly of the compressor, the splitter nose comprises an upper portion and a lower portion, the inlet of the annular conduit being located in the upper portion.

According to various advantageous embodiments of the invention, the compressor comprises an annular row of vanes that are fixedly joined to the outer shroud, the annular conduit in various instances being arranged axially in the region of the row.

The invention also relates to a splitter nose of an axial turbomachine, comprising: an annular casing which forms an annular cavity and a circular separation edge; an annular de-icing conduit that is arranged in the cavity, the conduit comprising an air inlet that is intended to be connected to a hot air supply pipe of the turbomachine; wherein the contacts, which are, for example, radial, between the conduit and the casing are joined in two diametrically opposed zones, each one extending over less than 60°, in various instances less than 30°, for example less than 10° of the annular conduit, one of the zones optionally being formed by the inlet; or the conduit is connected to the casing only at a second zone that is located at a position diametrically opposed to the inlet and optionally a first zone in the region of the air inlet, the second zone extending over less than 60°, in various instances less than 20°, for example less than 10° of the conduit, so as to allow expansion deformations of the conduit.

The invention also relates to an axial turbomachine for an aircraft, comprising a low-pressure compressor, in various instances the low-pressure compressor comprises the features and functions described herein.

According to various advantageous embodiments of the invention, the axial turbomachine further comprises a high-pressure compressor downstream of the low-pressure compressor, the hot air supply pipe of the low-pressure compressor being a compressed hot air supply pipe, which air is from the high-pressure compressor.

The invention also relates to an annular conduit that is intended to be arranged in an annular cavity that is formed by a circular casing of the splitter nose of the axial turbomachine, in particular of the compressor, the conduit comprising an inlet that is intended to be connected to a hot air supply pipe, and holes for the diffusion of hot air in the cavity.

Generally, the advantageous embodiments of each aspect of subject-matter of the invention are also applicable to the other aspects of subject-matter of the invention. The different aspects of subject-matter may be understood to be different interpretations of the invention. As far as possible, each aspect of subject-matter of the invention can be combined with the other aspects of subject-matter.

The measures of the invention are advantageous in that they make it easier to produce the splitter nose. This is because the annular conduit is connected to the casing at two opposite zones which promotes the expansion of the conduit outside those zones and reduces the mechanical constraints in the region of the fixing members and, consequently, the risks of breakage. The production and maintenance of such a splitter nose are further more economical.

The annular conduit has two diametrically opposed portions which are free from contact and which extend over at least 120° or at least 160°. During operation, the increase in temperature of the pipe brings about the deformation thereof by increasing the diameter or ovalisation. With the poles being maintained, the sides can move apart. The thermal constraints and the internal mechanical constraints are reduced. This all prevents the risk of breakage, for example, in the event of ingestion or vibrations.

With simplified contact locations, the splitter nose becomes simpler to configure. The assembly also benefits from this aspect. The whole forms a flexible assembly since a single flange is all that is needed for retention. The flange allows control of the expansion, where applicable directing it.

DRAWINGS

DETAILED DESCRIPTION

In the following description, the terms "internal" or "inner" and "external" or "outer" refer to a positioning in relation to the rotation axis of an axial turbomachine. The axial direction corresponds to the direction along the rotation axis of the turbomachine. The radial direction is perpendicular to the rotation axis.

Figure 1:
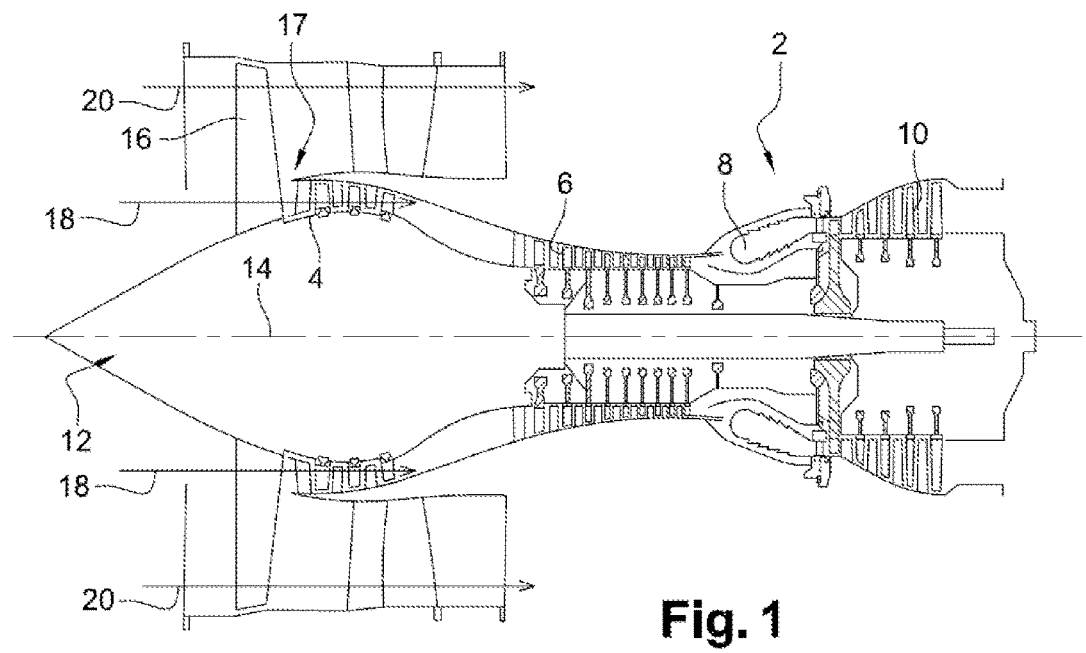
FIG. 1 is a simplified axially sectioned view of an axial turbomachine according to various embodiments the invention.

FIG. 1 is a simplified illustration of an axial turbine engine 2 for an aircraft. In this case, it is a double-flow turbojet engine, also called turboreator. It might be a turbo fan engine. The turbojet engine 2 comprises a first compression level that is referred to as the low-pressure compressor 4, a second compression level, that is referred to as the high-pressure compressor 6, a combustion chamber 8 and one or more turbine levels 10. During operation, the mechanical power of the turbine 10 is transmitted via a central shaft to a rotor 12 which moves the two compressors 4 and 6. Those compressors comprise a plurality of rows of rotor vanes which are associated with rows of stator vanes. The rotation of the rotor about the rotation axis 14 thereof thus allows the production of an air flow and compression of the air progressively as far as the inlet of the combustion chamber 8. The turbojet engine 2 also comprises an inlet ventilator that is commonly referred to as a fan or blower 16 and that is connected to the rotor 12 and which generates an air flow that is divided in the region of a splitter nose 17 into a primary flow 18 which passes through the various levels mentioned above of the turbojet engine, and a secondary flow 20 which passes through an annular cowl (partially illustrated) along the reactor in order subsequently to join the primary flow at the outlet from the turbine and to be accelerated so as to generate a thrust. The primary flow 18 and secondary flow 20 are annular flows; they are channelled by the casing of the turbojet engine. Compressed hot air from the high-pressure compressor 6 supplies the splitter nose via a supply pipe. That supply of hot air allows de-icing and anti-icing of the separation edge 22 of the splitter nose 17. The separation edge 22 is also called leading edge.

Figure 2:
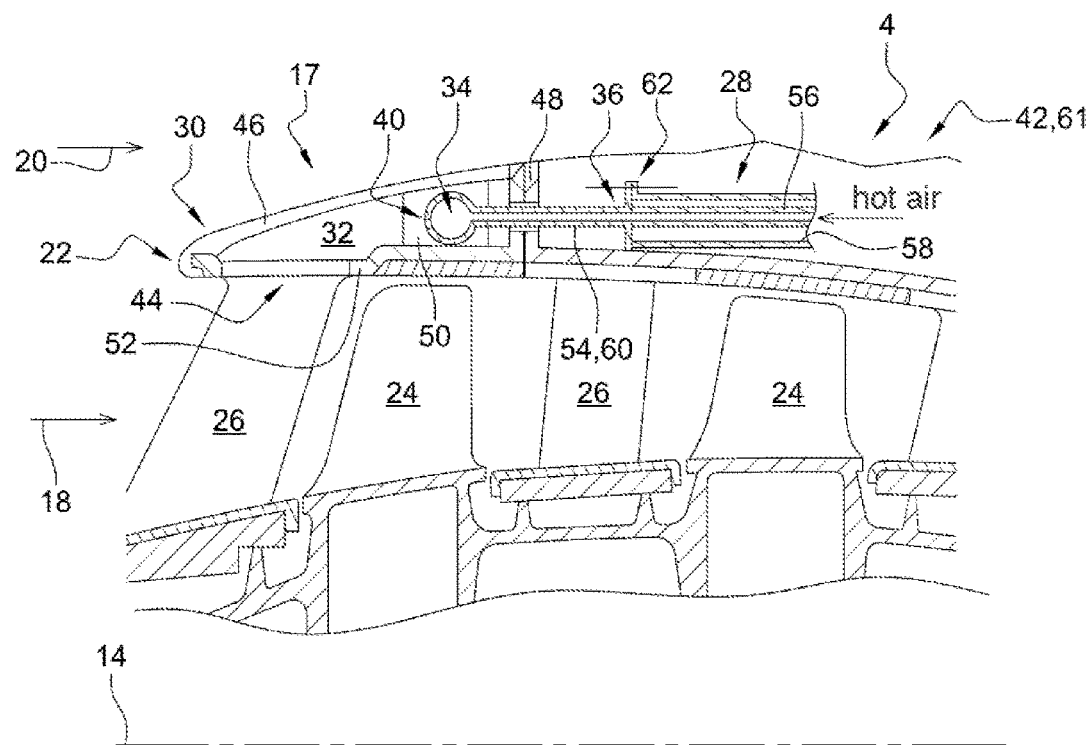
FIG. 2 is a simplified axially sectioned view of a low-pressure compressor of the turbomachine of FIG. 1, according to various embodiments the invention.

FIG. 2 is a simplified axially sectioned view of a low-pressure compressor 4 according to the invention. The compressor comprises the splitter nose 17 as introduced in relation to FIG. 1, rotor blades 24 that are paired with stator vanes 26 downstream of the splitter nose 17 for the progressive compression of the primary air flow 18. The splitter nose 17 is also called separation top, and forms the inlet of the compressor 4. The compressor 4 also comprises the hot air supply pipe 28 for de-icing the separation edge 22 as introduced in relation to FIG. 1. The splitter nose comprises an annular casing 30 which forms the separation edge 22 and an annular cavity 32; the splitter nose finally comprises an annular conduit 34 that is arranged in the annular cavity 32. The annular conduit 34 can form a closed loop or an open loop. It comprises an inlet 36 in communication with the hot air supply pipe 28 and an outlet that is formed by holes 40 in order to diffuse the hot air in the cavity 32 so as to de-ice the separation edge 22. It is possible to see in the illustration one of the holes 40 that is formed in the annular conduit and which allows the hot air of the annular conduit 34 to flow in the cavity 32. The conduit 34 is connected to the casing 30 only at a first zone 42 in the region of the air inlet and at a second zone (not visible) that is located at a position diametrically opposite the inlet in relation to the axis 14 of the turbojet engine so as to allow expansion deformations of the conduit. FIG. 2 sets out the first zone 42 of the annular conduit. It is possible to see in relation to FIGS. 3 and 4 the details concerning the second connection zone of the conduit with the casing. It is possible to see that the casing 30 comprises an internal circular wall 44, an external circular wall 46 and a partition wall 48. The internal circular wall 44 extends from the separation edge 22 and delimits the primary flow 18; the external circular wall 46 is concentric with the internal wall, extends from the separation edge and delimits the secondary flow 20; the partition wall 48 radially joins the internal and external walls 44 and 46. In the exemplary embodiments illustrated here, the annular conduit 34 is connected in the region of the first zone 42 to each of the internal and external walls 44 and 46 by a plate 50. However, that measure does not limit the invention in any way, the annular conduit 34 can be connected to the casing in the first zone at one or other of the internal and external walls 44 and 46. The conduit 34 can additionally or alternatively be connected to the partition wall 48. In the specific exemplary embodiments set out here, the internal wall 44 which receives an annular row of radial stator vanes 26 of the compressor comprises an outer shroud 52 to which the annular conduit 34 is connected. The conduit can be arranged axially in the region of the annular row of stator vanes 26, in this instance in the exemplary embodiments set out here, the annular conduit is located axially behind the row of stator vanes. In the specific exemplary embodiments, the separation edge 22 is integrally formed on the external circular wall 46 of the casing 30 of the splitter nose. However, that measure does not limit the invention in any way.

It is possible to see the hot air supply pipe 28, to which the inlet 36 of the annular conduit 34 is connected. The conduit is in this instance connected to the pipe via a tube 54 which extends transversely relative to the annular conduit. In the specific exemplary embodiments set out here, the tube 54 extends parallel with the axis of the turbomachine behind the annular conduit. The tube 54 can further be connected to the casing, for example, to the partition wall 48, by a flange. It can be connected by welding. The supply tube 28 comprises an internal wall 56 and an external wall 58 that is concentric with the internal wall, the hot air flowing inside the internal wall 56. That measure of the invention is advantageous in order to strengthen the pipe, it also allows the connection (not illustrated) of the pipe to the compressor to be insulated with respect to the internal wall 56 of the pipe that is a wall which can be heated by the hot air. However, that measure does not limit the invention; in alternative exemplary embodiments, the pipe 28 can comprise a single wall. The tube 54 forms a skin 60 which, at a first side (on the left in the illustration) is connected to the conduit 34 and, at a second side (on the right in the illustration) is connected to the pipe 28, in this instance by means of a screw type flange 62. The skin 60 of the tube is in communication with the wall 56 of the pipe forming the passage of hot air. In alternative exemplary embodiments (not illustrated), the tube which forms the inlet of the annular conduit can also comprise an internal skin and an external skin that is concentric with the internal skin; one or each of the skins being able to be connected to the annular conduit. It is evident that the annular conduit 34 has a circular cross-section, in alternative exemplary embodiments it can have a different cross-section, in accordance with the space available in the cavity; the conduit can by way of example have an oval cross-section. The annular conduit can be substantially retained in the region of the second zone (not visible) and in the region of the tube 54 and/or the pipe 28, that is to say, downstream of the splitter nose.

The splitter nose 17 of the compressor 4, when the compressor is mounted in the normal direction, comprises an upper portion 61 and a lower portion (not visible), the air inlet 36 of the annular conduit 34 is located in this instance on the upper portion 61 of the splitter nose 17. In alternative exemplary embodiments, the air inlet 36 can be located in the lower portion of the splitter nose.

Figure 3:
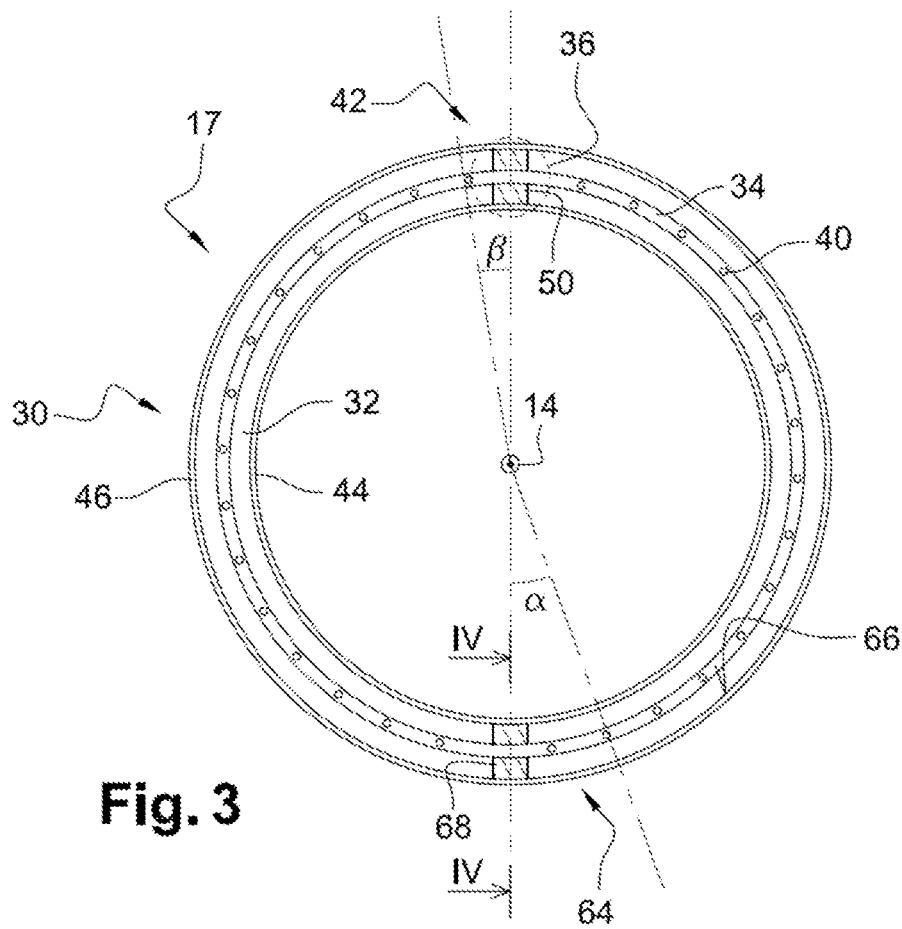
FIG. 3 is a schematic radially sectioned view of a splitter nose of the compressor of FIG. 2, according to various embodiments the invention.

FIG. 3 is a schematic radially sectioned view of a splitter nose 17 according to the invention. There can be seen the internal and external walls 44 and 46 of the casing 30 which form the annular cavity 32. There can also be seen the annular conduit 34 that is connected to the casing 30 at the first zone 42 in the region of the air inlet 36 (with broken lines) and at the second zone 64 that is located at a position that is in this instance diametrically opposite the axis 14 of the turbojet engine at the position of the air inlet 36. The second zone 64 can form in relation to the axis 14 of the turbojet engine an angle "α" less than 60°, or less than 45°; or less than 30°, or less than 20°, or less than 10° with respect to the position diametrically opposite the air inlet.

Furthermore, the first fixing zone 42 of the annular conduit 34 can form an angle "β" with respect to the axis 14 less than 60°, or less than 45°; or less than 30°, or less than 20°, or less than 10° with respect to the position of the air inlet 36. Furthermore, the annular conduit 34 can be connected to the casing 30 at one or more positions in the first zone and the second zone, respectively.

It can be seen that the annular conduit 34 is free from contact with the circular casing 30 with the exception of the first and second zones 42 and 64; more specifically, the internal surface 66 which delimits the cavity 32 that is formed by the circular casing 30 is free from fixing means of the annular conduit over more than 120°, in various instances more than 160°. The second zones 64 can be a support zone. The support zone can be arranged in the lower half of the conduit so as to bear it. There can be seen in the drawing the connection plate 50 of the annular conduit with respect to the casing in the region of the first zone 42. The annular conduit is also connected to the casing by a plate 68 in the second zone 64. However, the specific exemplary embodiments of the invention do not limit the invention in any way. In alternative exemplary embodiments, the annular conduit can be connected to the casing, in the first and second zones, by screw type fixing means or flange type fixing means or hook type fixing means which partially surround the conduit. Those means substantially ensure radial contact type connections. In the specific exemplary embodiments in which the annular conduit is connected to the casing at zones which form angles "α" and "β", the annular conduit 34 can be connected to the casing at a plurality of positions, for example, by a plurality of flanges and/or a plurality of plates and/or a plurality of hooks. Those different connection solutions for the annular conduit can extend radially or axially.

Finally, there can be seen in the annular conduit 34 a series of outlet holes 40 for the flow of hot air in the annular cavity. Those holes are distributed over the whole of the circumference of the conduit and have a cross-section of flow which increases with the distance from the inlet of the conduit. That measure is advantageous in that it promotes the uniformity of the diffusion of air in the cavity. However, that measure does not limit the invention and those holes can alternatively be located in a portion of the annular conduit and have a constant cross-section.

Figure 4:
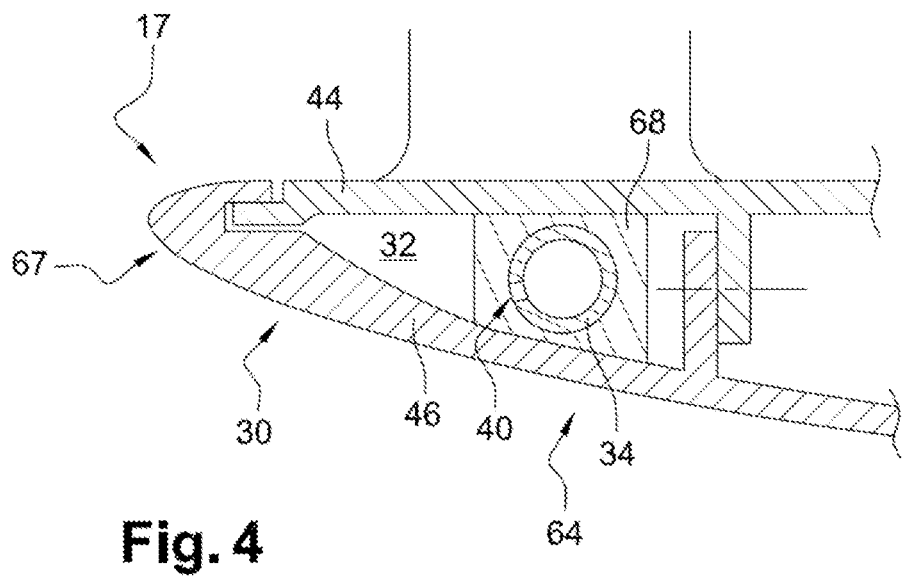
FIG. 4 is a simplified axially sectioned view of the splitter nose of FIG. 3, according to various embodiments the invention.

FIG. 4 is a simplified axially sectioned view IV-IV of the splitter nose 17 in the region of the second fixing zone 64 located in this instance in the lower portion 67 of the splitter nose. There can be seen the annular conduit 34 that is connected by the connection plate 68 to each of the internal and external walls 44 and 46, respectively. In alternative exemplary embodiments, the annular conduit can be connected to the casing 30 via one or other of the internal and external walls; it can additionally or alternatively be connected to the partition wall 48.

What is claimed is:

1. A splitter nose of an axial turbomachine, said splitter nose comprising:
   an annular casing that forms an annular cavity and a circular separation edge of an air flow of the turbomachine; and
   an annular conduit that is arranged in the annular cavity, the annular conduit being configured to de-ice the separation edge by circulation of hot air in the cavity, and the conduit comprises an air inlet that is structured and operable to be connected to a hot air supply pipe of the turbomachine, the air inlet forming a first zone; wherein
   the conduit is connected to the casing only in a second zone, diametrically opposite the air inlet, and in the region of the air inlet, the second zone forming an angular portion of the annular conduit that is less than 60° so as to allow expansion deformations of the conduit.

2. The splitter nose of claim 1, wherein the second zone forms an angular portion of the annular conduit that is at most 30°.

3. The splitter nose of claim 1, wherein the annular casing comprises an internal surface that delimits the cavity, that is free from fixation in contact with the annular conduit over at least 120°.

4. The splitter nose of claim 1 further comprising a flange joining the second zone of the annular conduit to the annular casing, the flange extending radially and axially.

5. The splitter nose of claim 1, wherein the annular conduit is connected to several hooks that partially surround the annular conduit.

6. The splitter nose of claim 1, wherein the casing comprises an internal circular wall that extends from the separation edge and that is able to delimit a primary flow, and an external circular wall that is concentric with the internal wall and that extends from the separation edge and that is able to delimit a secondary flow, and at least one partition wall that radially joins the internal and external walls, the conduit being connected to the first zone and the second zone at least over one of the internal and external walls.

7. The splitter nose of claim 6, wherein the internal wall comprises an outer shroud with an annular row of stator vanes projecting radially.

8. The splitter nose of claim 6, wherein the separation edge is integrally formed on the external circular wall.

9. The splitter nose of claim 1, wherein the air inlet comprises a tube that extends transversely to the annular conduit and that comprises a first external skin and a second internal skin that is concentric with the first external skin, each of the skins being connected to the conduit.

10. The splitter nose of claim 9, wherein the tube extends parallel with the axis of the turbomachine.

11. The splitter nose of claim 9, wherein the tube is fixed to the annular casing.

12. The splitter nose of claim 1, wherein the annular conduit comprises a series of outlet holes for the circulation of hot air in the annular cavity.

13. The splitter nose of claim 1, wherein the annular conduit has one of a circular and an oval cross-section.

14. A compressor of an axial turbomachine, said compressor comprising a splitter nose comprising:
   an annular casing that forms an annular cavity and a circular leading edge separating an air flow entering in the compressor; and
   an annular conduit that is arranged in the annular cavity, the annular conduit being configured to de-ice the separation edge by circulation of hot air in the cavity, and the conduit comprises an air inlet structured and operable to be connected to a hot air supply pipe of the turbomachine; wherein
   the conduit is linked to the casing only angularly level the air inlet, and
   in a support zone that is diametrically opposite the air inlet, and that forms an angular portion of at most 60° of the annular conduit.

15. The compressor of claim 14 further comprising a supply pipe with an internal wall and an external wall, the inlet of the annular conduit being connected to the supply pipe in the region of one of the internal and external walls.

16. The compressor of claim 14, wherein in the normal direction of assembly, the splitter nose comprises an upper portion and a lower portion, the inlet of the annular conduit being located in the upper portion.

17. The compressor of claim 14, wherein the splitter nose comprises an outer shroud and the compressor comprises an annular row of vanes that are rigidly fixed to the outer shroud.

18. An axial turbomachine for an aircraft, said axial turbomachine comprising a hot air supply pipe and a low-pressure compressor with a splitter nose; the splitter nose comprising:
    an annular casing that forms an annular cavity and a circular separation edge; and
    an annular de-icing conduit that is arranged in the cavity, the conduit comprising an air inlet that is connected to the hot air supply pipe; wherein
    all contacts between the annular de-icing conduit and the annular casing are gathered in two diametrically opposed zones, each of the diametrically opposed zones extending over at most 30° so as to allow expansion deformations of the conduit between the opposed zones.

19. The axial turbomachine of claim 18 further comprising a high-pressure compressor downstream of the low-pressure compressor, the hot air supply pipe being connected to the high-pressure compressor.

\* \* \* \* \*